(12) United States Patent
Litteken et al.

(10) Patent No.: US 10,816,420 B1
(45) Date of Patent: Oct. 27, 2020

(54) NON-INVASIVE TENSION-MEASUREMENT DEVICES AND METHODS

(71) Applicant: United States of America as represented by the Administrator of NASA, Washington, DC (US)

(72) Inventors: Douglas A Litteken, Houston, TX (US); Jared S Daum, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 289 days.

(21) Appl. No.: 15/946,265

(22) Filed: Apr. 5, 2018

(51) Int. Cl.
*G01L 5/102* (2020.01)

(52) U.S. Cl.
CPC .................... *G01L 5/102* (2013.01)

(58) Field of Classification Search
CPC .......... G01L 5/06; G01L 5/042; G01L 5/045; G01L 5/107; G01L 5/102; F16G 11/12; F16G 11/106; F16G 11/048; F16G 11/07; F16G 11/143; F16G 11/09; F16G 11/08; F16G 11/101; F16G 11/025; F16G 11/103; F16G 11/105; B21F 9/02; B21F 9/002
See application file for complete search history.

(56) References Cited

U.S. PATENT DOCUMENTS

| 1,723,816 | A | * | 8/1929 | Rumsey | ............... G01L 5/04 |
| | | | | | 73/158 |
| 2,362,626 | A | * | 11/1944 | Giffen | ............... G01L 5/102 |
| | | | | | 73/862.392 |
| 2,582,437 | A | * | 1/1952 | Jezewski | ............ G01N 27/9033 |
| | | | | | 324/241 |
| 3,176,510 | A | | 4/1965 | Kimmell et al. | |
| 3,372,562 | A | | 3/1968 | Weiss et al. | |

(Continued)

FOREIGN PATENT DOCUMENTS

| CA | 2203601 | 3/2004 |
| CN | 2807243 | 8/2006 |

(Continued)

OTHER PUBLICATIONS

Product: Tension Meters Overview, Dillon, dillon-force.com, accessed: Apr. 2017. http://www.dillon-force.com/product/tension-meters/quick-check.html Disclosing a strain gauge mounting onto cable and registering tension by displacement (the illustrated overview).

(Continued)

*Primary Examiner* — Tran M. Tran
(74) *Attorney, Agent, or Firm* — Theodore U. Ro; Edward K. Fein

(57) ABSTRACT

A tension-measurement device configured to determine a tension in a line includes a body. The body includes a first portion, a second portion extending from the first portion of the body, and a third portion extending from the first portion of the body. The line is configured to extend at least partially through the second and third portions of the body. A first sensor is coupled to the body and is configured to measure a strain on the body when a first portion of the line is placed under tension. The tension in the first portion of the line is configured to be determined based at least partially upon the strain.

9 Claims, 7 Drawing Sheets

(56) References Cited

U.S. PATENT DOCUMENTS

| | | | |
|---|---|---|---|
| 3,436,962 A | 4/1969 | Laws | |
| 3,545,264 A * | 12/1970 | Lesure | G01N 3/04 |
| | | | 73/833 |
| 3,629,909 A * | 12/1971 | Riley | F16B 2/14 |
| | | | 403/371 |
| 3,698,244 A | 10/1972 | Deming | |
| 3,943,761 A | 3/1976 | Shoberg et al. | |
| 4,316,307 A * | 2/1982 | Hurst | F16G 11/12 |
| | | | 24/31 F |
| 4,333,649 A * | 6/1982 | Vaughn | F16B 2/14 |
| | | | 24/115 M |
| 4,402,229 A | 9/1983 | Byrne | |
| 4,562,743 A | 1/1986 | Bonine | |
| 4,615,509 A * | 10/1986 | Biass | B66D 3/006 |
| | | | 254/228 |
| 4,889,006 A * | 12/1989 | Kolinske | F16B 21/20 |
| | | | 74/502.4 |
| 5,277,406 A * | 1/1994 | Knight | B66D 1/50 |
| | | | 114/213 |
| 5,299,462 A | 4/1994 | Key | |
| 5,578,762 A | 12/1996 | Chiaro et al. | |
| 5,582,447 A * | 12/1996 | Leon | G09F 3/0317 |
| | | | 24/115 M |
| 6,041,666 A * | 3/2000 | MacKarvich | G01L 5/06 |
| | | | 73/828 |
| 6,343,515 B1 | 2/2002 | Dodson | |
| 6,588,088 B2 * | 7/2003 | Dondiz | H01T 19/00 |
| | | | 29/452 |
| 6,685,483 B2 | 2/2004 | Blauvelt | |
| 6,740,878 B2 * | 5/2004 | Dondiz | H01T 19/00 |
| | | | 250/281 |
| 7,313,975 B1 * | 1/2008 | Scorteanu | G01L 5/103 |
| | | | 254/257 |
| 7,424,832 B1 | 9/2008 | Nunnelee | |
| 7,478,563 B2 | 1/2009 | Weisman | |
| 7,971,486 B2 | 7/2011 | Sturzer | |
| 8,371,177 B2 * | 2/2013 | Ihrke | G01L 5/102 |
| | | | 73/760 |
| 8,890,516 B2 | 11/2014 | Tsukada et al. | |
| 9,249,577 B2 * | 2/2016 | Ross | E04F 11/1859 |
| 9,576,475 B2 | 2/2017 | Bardin et al. | |
| 10,206,729 B2 * | 2/2019 | Pratt | A61B 17/82 |
| 10,578,503 B2 * | 3/2020 | Rubinski | G01L 5/24 |
| 2003/0097788 A1 | 5/2003 | Kell | |
| 2006/0053897 A1 | 3/2006 | Kuivala et al. | |
| 2008/0028864 A1 | 2/2008 | Gibert | |
| 2008/0307885 A1 * | 12/2008 | Ravitch | G01H 5/00 |
| | | | 73/597 |
| 2011/0027007 A1 | 2/2011 | Tunno et al. | |
| 2011/0259110 A1 * | 10/2011 | Smith | G01B 3/18 |
| | | | 73/760 |
| 2012/0174686 A1 * | 7/2012 | Fujimoto | G01L 5/102 |
| | | | 73/862.624 |
| 2014/0041458 A1 * | 2/2014 | Smith | G01B 3/18 |
| | | | 73/856 |

FOREIGN PATENT DOCUMENTS

| | | |
|---|---|---|
| CN | 203405377 | 1/2014 |
| EP | 1310780 | 5/2003 |
| GB | 2063494 | 6/1981 |
| KR | 101719573 | 3/2017 |
| WO | 2007145511 A1 | 12/2007 |
| WO | 2012033447 A1 | 3/2012 |

OTHER PUBLICATIONS

"Wire Tension Meters & Accessories: Mechanical Tension Meters," altic, altic-coil-winding.com, accessed: Apr. 2017. http://altic-coil-winding.com/product-range/accessories/Disclosing small pistol-grip and spatula style tension meters (Illustrations).

* cited by examiner

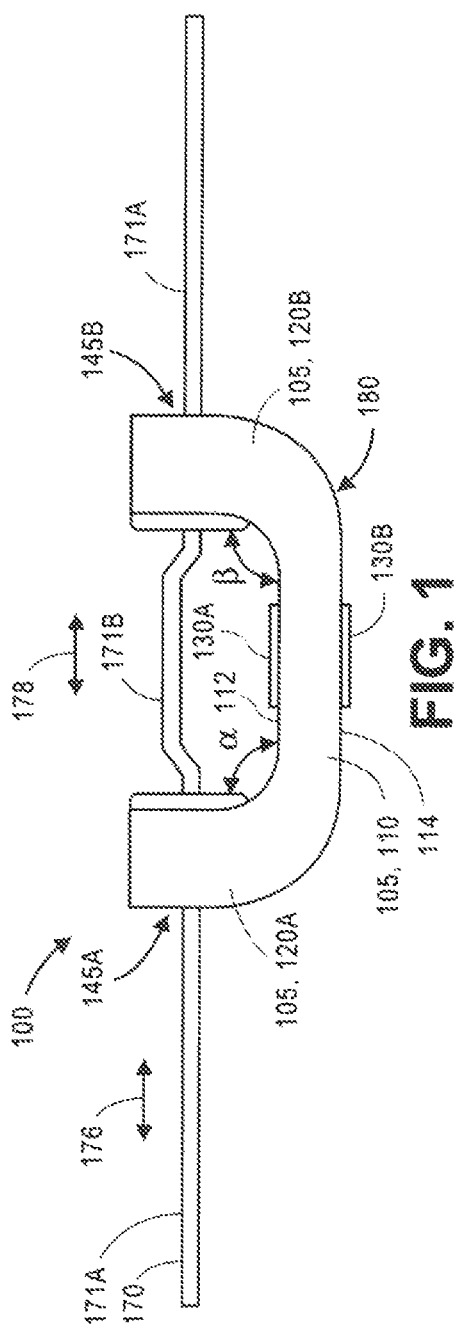
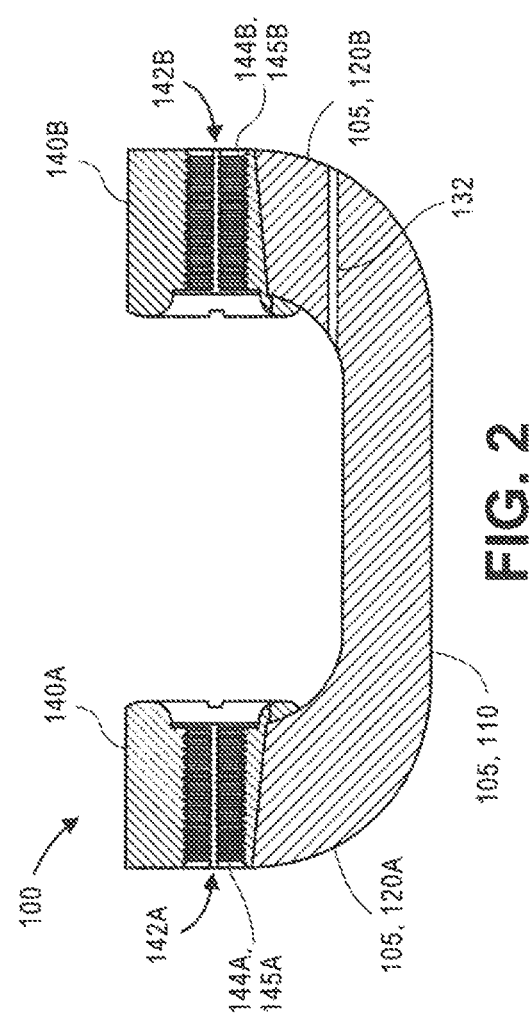

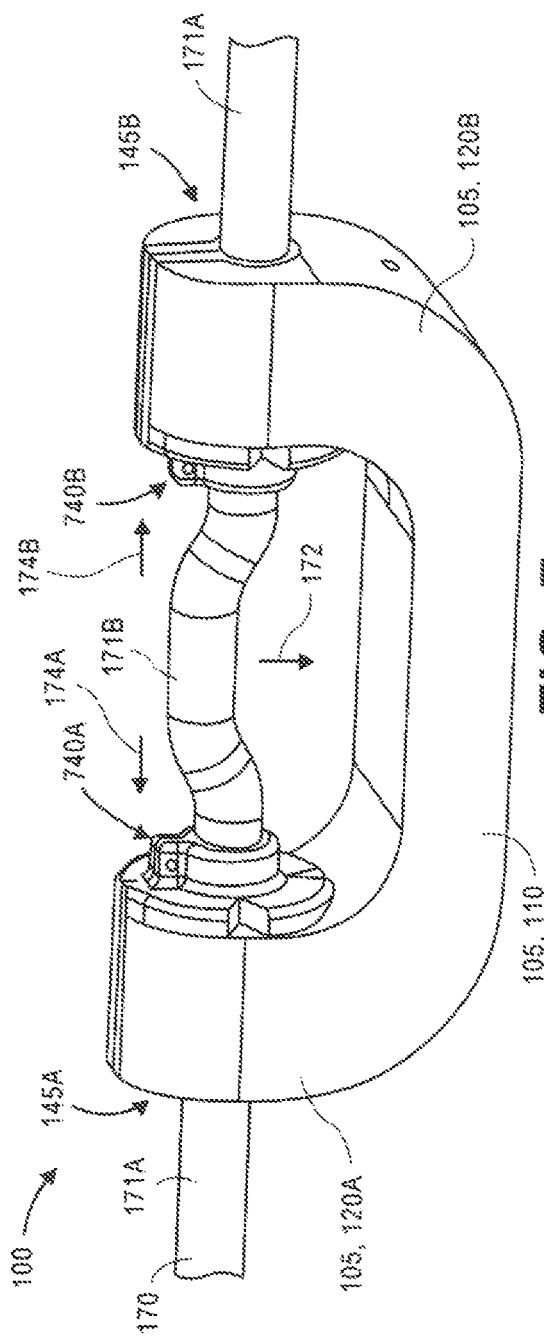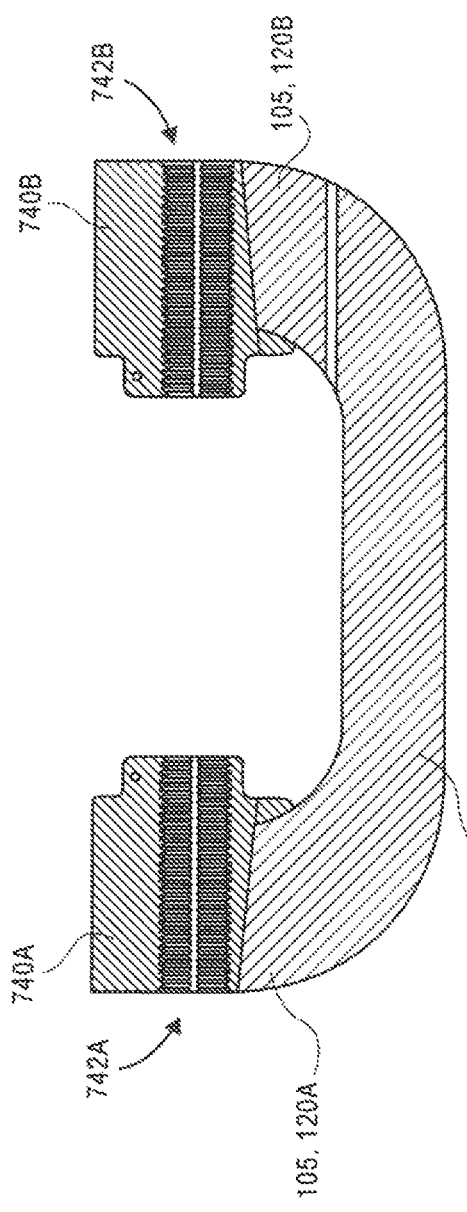

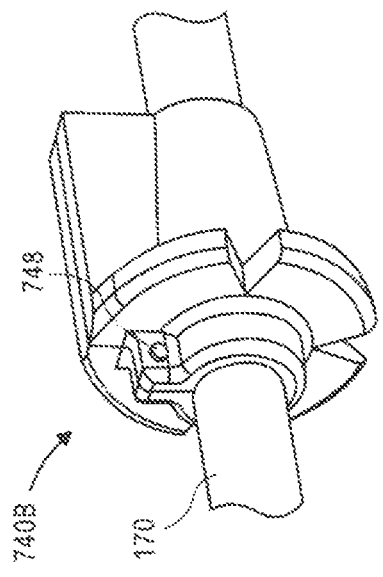
FIG. 9
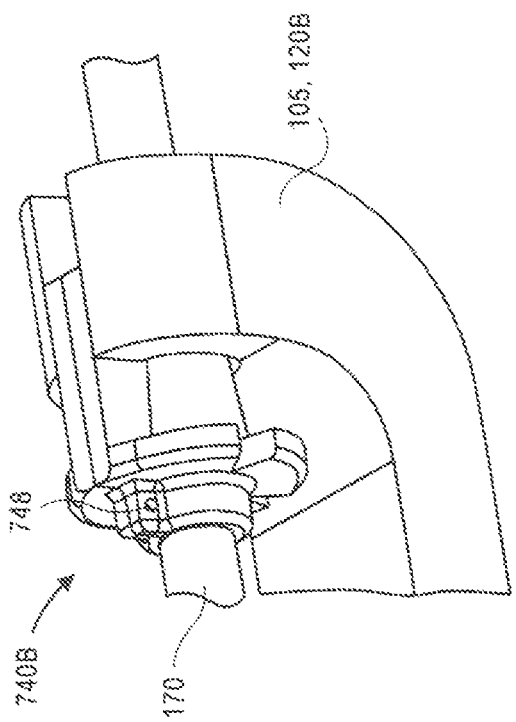
FIG. 11
FIG. 10
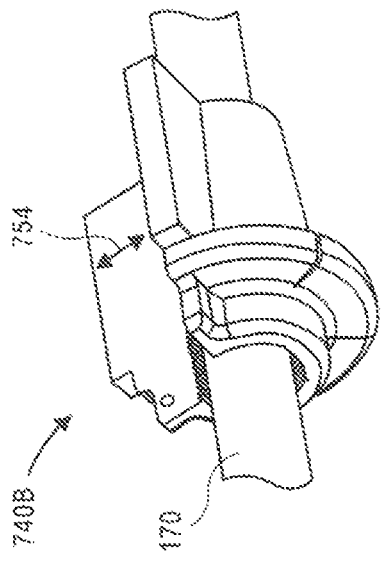
FIG. 12

NON-INVASIVE TENSION-MEASUREMENT DEVICES AND METHODS

ORIGIN OF THE INVENTION

The invention described herein was made by employees of the United States government and may be manufactured and used by or for the government of the United States of America for governmental purposes without the payment of any royalties thereon or thereof.

BACKGROUND

Apparatuses such as parachutes include lines (e.g., cords, cables, etc.), that are placed under tension. Such lines may be tailored for heavy-duty, high-tension applications; however, this heavy-duty construction adds to the weight of the apparatus. Devices for measuring the tension in a line (i.e., line tensiometers) are known and may enable a user to select lighter-weight lines for certain operations. However, some current measurement device designs rely on severing the line (i.e., breaking the load path) to introduce a load cell. These load cells are reliable, but introduce an area of high stiffness in the load path, directly affecting the structural response, adding extra weight, and possibly altering the dynamics of the line during a test. Additionally, other line tensiometers do not rely on severing the line but do rely on three (3) points of contact with the subject line to execute a three-point bending flexural test. The reliance on three points of contact with the subject line is not optimal as it introduces a change in the line's nominal shape, relies on the line's material properties, requires calibration for each application, as well as adds to complexity and cost. What is needed, therefore, is an improved system and method for measuring the tension in a line.

SUMMARY

A tension-measurement device configured to determine a tension in a line is disclosed. In an embodiment, the device includes a body having a first portion, a second portion extending from the first portion of the body, and a third portion extending from the first portion of the body. In this embodiment, the line is configured to extend at least partially through the second and third portions of the body. In this embodiment, a first sensor is coupled to the body and is configured to measure a strain on the body when a first portion of the line is placed under tension. The tension in the first portion of the line is configured to be determined based at least partially upon the strain.

In another embodiment, the device includes a body having a first portion, a second portion extending from the first portion of the body, and a third portion extending from the first portion of the body. The second and third portions of the body extend in a same direction from opposing ends of the first portion of the body, such that the body is substantially C-shaped. In this embodiment, an insert is positioned at least partially within the second portion of the body. The insert includes a substantially cylindrical portion defining a bore through which the line is configured to extend. In this embodiment, a first sensor is coupled to a first side of the first portion of the body that faces the line when the line is extending through the insert. In this embodiment, a second sensor is coupled to a second, opposite side of the first portion of the body that faces away from the line when the line is extending through the insert. The first and second sensors are configured to measure a strain on the body when a first portion of the line, outside the first and second portions of the body, is placed under tension, and when a second portion of the line, between the second and third portions of the body, is not under tension. The tension in the first portion of the line is configured to be determined based at least partially upon the strain.

A method for determining a tension in a line is also disclosed. The method includes inserting the line into a first bore in a first arm of a body. The method also includes inserting the line into a second bore in a second arm of the body. The first and second arms extend from a handle of the body. The method also includes placing a first portion of the line under tension while a second portion of the line is not under tension. The first portion of the line is outside of the first arm, the second arm, or both, and the second portion of the line is between the first and second arms. The method also includes measuring a strain on the body using a first sensor that is coupled to the body. The tension in the line is determined based at least partially upon the strain on the body measured by the first sensor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 1 illustrates a side view of a tension-measurement device with a line extending therethrough, according to an embodiment.

FIG. 2 illustrates a cross-sectional side view of the tension-measurement device, according to an embodiment.

FIG. 7 illustrates a perspective view of another embodiment of the tension-measurement device with the line extending therethrough, according to an embodiment.

FIG. 8 illustrates aside, cross-sectional view of the of the tension-measurement device without the line extending therethrough, according to an embodiment.

FIG. 9 illustrates a perspective view of the second insert in an open state, according to an embodiment.

FIG. 10 illustrates a perspective view of the second insert in the open state with the line positioned therein, according to an embodiment.

FIG. 11 illustrates a perspective view of the second insert in a closed state with the line positioned therein, according to an embodiment.

FIG. 12 illustrates a perspective view of the second insert in the closed state with the line positioned therein as the second insert is being positioned within the second arm, according to an embodiment.

DETAILED DESCRIPTION

Figure 3:
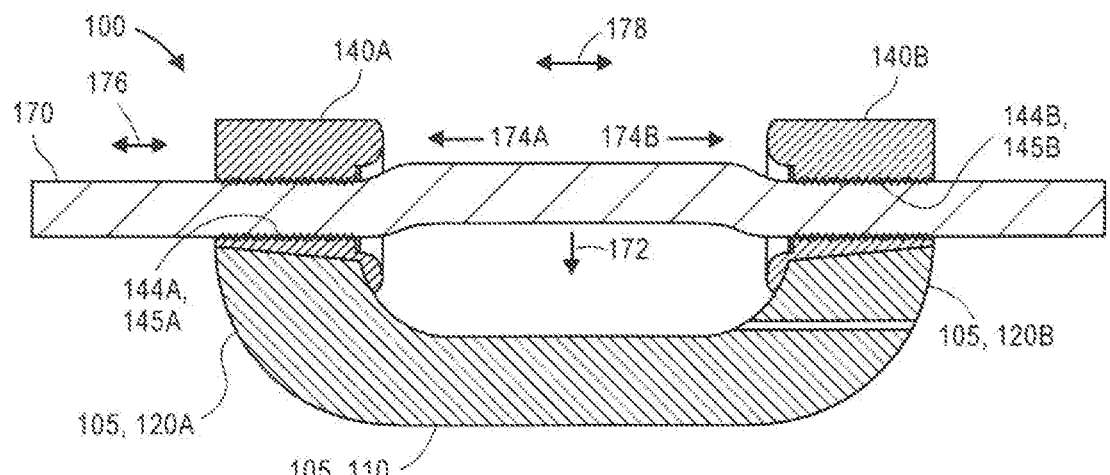
FIG. 3 illustrates a cross-sectional side view of the tension-measurement device with the line extending therethrough, according to an embodiment.

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The need for lightweight and non-intrusive tension measurements has arisen alongside the development of high-fidelity computer models such as e.g., of textile and fluid dynamics. In order to validate these computer models, data may be gathered in an operational environment without altering the design, construction, or performance of a test article such as, e.g., parachute cordage or a mooring line. To capture the required data for analysis validation without affecting the response of a subject system, a non-invasive measurement device may be used, as described herein. Embodiments of the tension-measurement device may be configured to minimally impact to the mass, form, fit, and function of the test article, while providing reliable, axial tension measurements of the test article.

Positive margins of safety are required throughout the structural members to ensure reliability, but this is generally balanced with minimizing system mass (e.g., a parachute). Some embodiments may have the capability to transmit data in real-time to software on a payload. Where the system is a parachute, the data gathered by the tension-measurement device can be used to determine the best conditions for parachute deployment phases or actuate components (e.g., a reefing line cutter) during flight operation. As with most data systems, size and weight may be minimized in order to reduce impacts to the system. In addition, the introduction of a point mass may introduce dynamics or loads which are a product of the presence of the measurement device itself. In another embodiment, the tension-measurement device may function without altering the state of the subject system, both during instrumentation and after removal of the device. Finally, due to the harsh operational environments (e.g., for a parachute, such harsh operational environments may include high packing pressures, large deployment forces, electromagnetic environment), the tension-measurement device and any data acquisition hardware may be robust and reliable. In addition to parachutes, the tension-measurement device may be used to measure the tension in lines that are part of uprighting bags, inflatable, expandable structures, sailboats, climbing, sports, inflatable buildings, boat/harbor rigging, crane rigging, seatbelts, or the like.

FIG. 1 illustrates a side view of a tension-measurement device 100 with a line 170 extending therethrough, according to an embodiment. As mentioned above, the tension-measurement device 100 may be a non-invasive measurement device used to measure tension 176 in the line 170 without cutting or severing the line 170. Additionally, the tension-measurement device 100 may include only two points of physical contact (also referred to as first and second points of contact 145A, 145B) with the line 170 to execute a flexural test without three (or more) points of contact. As used herein, the "line" 170 may be or include any flexible member in tension such as rope, cord, cable, chain, strap, thread, or the like.

The tension-measurement device 100 may include a substantially C-shaped body 105. The body 105 may be made at least partially of a metal (e.g., aluminum). In at least one embodiment, the body 105 may be produced using a 3D printer. The body 105 may include a first portion (also referred to as an elongated portion or a handle) 110 that is substantially parallel to the line 170. The body 105 may also include second and third portions (also generally referred to as arms and specifically referred to as a first arm 120A and second arm 120B) that are coupled to or integral with the handle 110. The first and second arms 120A, 120B may be positioned at opposite ends of the handle 110. The first and second arms 120A, 120B may be substantially non-parallel or perpendicular to the handle 110 and/or the line 170. The first arm 120A may include the first point of contact 145A, and the second arm 120B may include the second point of contact 145B. Note, there is no third point of contact between tension measurement device 100 and the line 170.

One or more sensors (a first sensor 130A and second sensor 130B) may be coupled to the body 105. As shown, the first sensor 130A may be coupled to a first (e.g., upper/top) surface 112 of the handle 110 that faces the line 170, and the second sensor 130B may be coupled to a second (e.g., lower/bottom) surface 114 of the handle 110 that faces away from the line 170. The sensors 130A, 130B may be or include (e.g., foil) strain gauges that are configured to measure the strain and/or stress 180 on the body 105 (e.g., the handle 110) in response to the tension 176 in the line 170. For example, the sensors 130A, 130B may be configured with two additional sensors in a full Wheatstone bridge circuit to provide bending strain that is unaffected by temperature changes, wiring resistance, and torsion loads on the tension-measurement device 100. The Wheatstone bridge may provide a direct measurement of the strain and/or stress 180 in the handle 110 that is directly correlated to the axial tension load 176 on the line 170 (as shown in FIG. 7).

The line 170 may extend through the first and second arms 120A, 120B when the tension 176 on the line 170 is measured. As shown in FIG. 1 and described in greater detail below, during the measurement, a first portion of the line 171A, outside one or both of the first and second arms 120A, 120B, may be under tension 176 (the tension to be measured), and a second portion of the line 171B, between the first and second arms 120A, 120B, may be slack (i.e., not under tension) 178. The tension 176 may cause the body 105 to bend, deflect, or otherwise deform. For example, an angle α between the handle 110 and the first arm 120A and/or an angle β between the handle 110 and the second arm 120B may increase in response to the bending, deflection, etc. For example, the angle α and/or the angle β may initially be from about 80° to about 100° (e.g., about 90°) before the line 170 is inserted and/or the tension 176 is applied to the line 170. The angle α and/or the angle β may increase by about 0.1° to about 10°, about 0.2° to about 8°, or about 0.3° to about 6° in response to the tension 176 in the line 170. As the angles α, β increase, the strain on the handle 110 also increases as it bends and deflects, and the sensors 130A, 130B may measure this strain.

FIGS. 2 and 3 illustrate cross-sectional side views of the tension-measurement device 100 without the line 170 (FIG. 2) and with the line 170 (FIG. 3), according to an embodiment. The first and second arms 120A, 120B may have first and second axial bores 142A, 142B formed therethrough, respectively, that are configured to receive the line 170. Thus, the first and second bores 142A, 142B may be substantially parallel to the line 170 and/or the handle 100. In at least one embodiment, the first and second arms 120A, 120B may have first and second inserts 140A, 140B positioned at least partially therein, respectively, and the first and second inserts 140A, 140B may define the first and second bores 142A, 142B. The first and second inserts 140A, 140B may be made of rubber, plastic, composite, or metallic. At least a portion of the outer surface of the first and second inserts 140A, 140B (and/or the inner surface(s) of the first and second arms 120A, 120B that receive the first and second inserts 140A, 140B) may be conical or frustoconical to form a friction fit within the corresponding first and second bores 142A, 142B. For example, a width of the first and second inserts 140A, 140B may decrease proceeding from the inner sides of the first and second inserts 140A, 140B to the outer sides of the first and second inserts 140A, 140B.

The inner surfaces of the first and second inserts 140A, 140B that define the first and second bores 142A, 142B may include a first gripping structure 144A and a second gripping structure 144B (e.g., teeth) that are configured to grip the line 170 and in this embodiment, also serve as the first and second points of contact 145A, 145B with the line 170. For example, the first and second gripping structures 144A, 144B may be configured to grip the line 170 tighter as the tension 176 increases without damaging the line 170 or causing the line 170 to break. The tension measurement device 100 includes only two (2) points of contact 145A, 145B with the line 170 and does not include three (3) or more points of contact with the line 170. In another embodiment, the first and second inserts 140A, 140B may include an inner friction grip that fits on the inside of the line 170 and is made of a conical-shaped rubber stopper. In yet another embodiment, the first and second inserts 140A, 140B may each include a cam cleat that utilizes a cleat stopper and a rubber gripper to hold the line 170 in place. In yet another embodiment, a binding clamp may be included to secure the line 170 to the first and second arms 120A, 120B.

In at least one embodiment, one or more additional bores (one is shown: 132) may be formed through the body 105 and through which a cable (not shown) may pass that is connected to the first sensor 130A, the second sensor 130B, or both. The cable may provide power and/or transmit the measurements from the first sensor 130A, the second sensor 130B, or both to a data processor.

Figure 4:
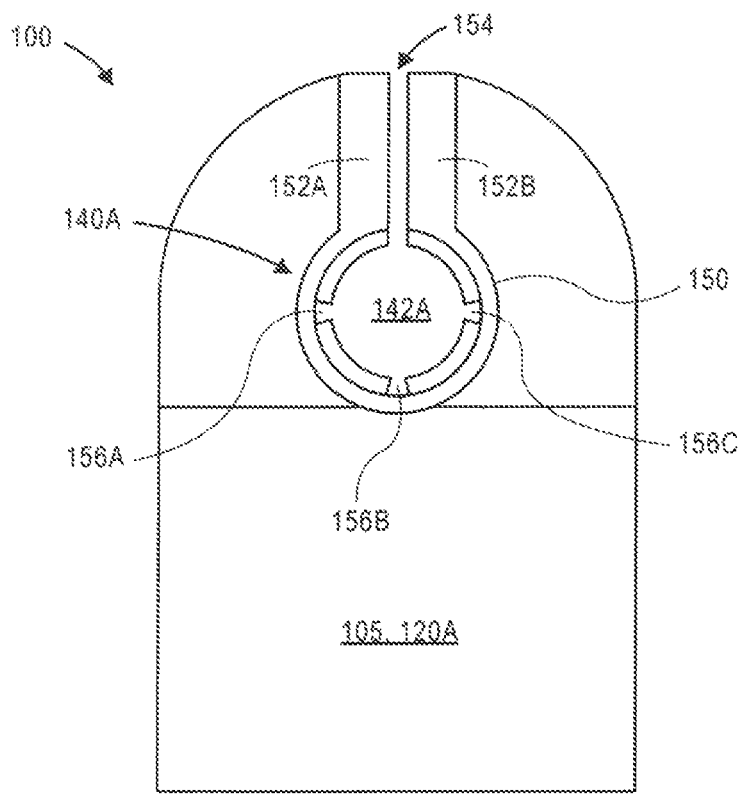
FIG. 4 illustrates an end view of the tension-measurement device, according to an embodiment.

FIG. 4 illustrates an end view of the tension-measurement device 100 showing the first insert 140A positioned within the first arm 120A, according to an embodiment. The first insert 140A may include a substantially cylindrical portion 150 that defines the first bore 142A. The first insert 140A may also include one or more arms (a third arm 152A and a fourth arms 152B) that extend radially-outward from the cylindrical portion 150. As shown, a width of the cylindrical portion 150 may be greater than a width between the outer surfaces of the third and fourth arms 152A, 152B to help prevent the first insert 140A from sliding out of the first arm 120A of the tension-measurement device 100 in the direction that the third and fourth arms 152A, 152B of the first insert 140A extend. The third and fourth arms 152A, 152B of the first insert 140A may define a gap/channel 154 therebetween through which the line 170 may be introduced into the first bore 142A defined by the cylindrical portion 150. The width of the channel 154 may be such that the inner surfaces of the third and fourth arms 152A, 152B do not contact while the line 170 is inserted and/or under load. The inner surface of the cylindrical portion 150 may define one or more radial recesses (three are shown: 156A-C). The radial recesses 156A-C may be circumferentially-offset from one another. The radial recesses 156A-C may facilitate the first insert 140A bending or flexing when the line 170 is being introduced through the channel 154.

Figure 5:
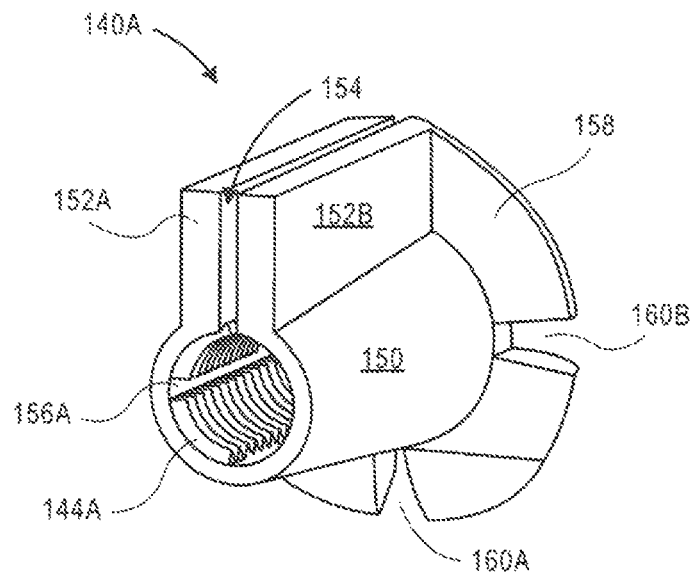
FIG. 5 illustrates a perspective view of an insert in the tension-measurement device, according to an embodiment.

FIG. 5 illustrates a perspective view of the first insert 140A, according to an embodiment. The first insert 140A may include a stopper 158. The stopper 158 may be positioned on one axial end of the cylindrical portion 150 and/or the third and fourth arms 152A, 152B. The stopper 158 may extend radially-outward from the cylindrical portion 150. The stopper 158 may extend circumferentially from the third and fourth arms 152A, 152B. The outer surface of the stopper 158 may define one or more radial recesses (a first radial recess 160A and a second radial recess 160B). The first and second radial recesses 160A, 160B may be circumferentially-offset from one another. The first and second radial recesses 160A, 160B may facilitate the first insert 140A bending or flexing when the line 170 is being introduced through the channel 154.

Figure 6:
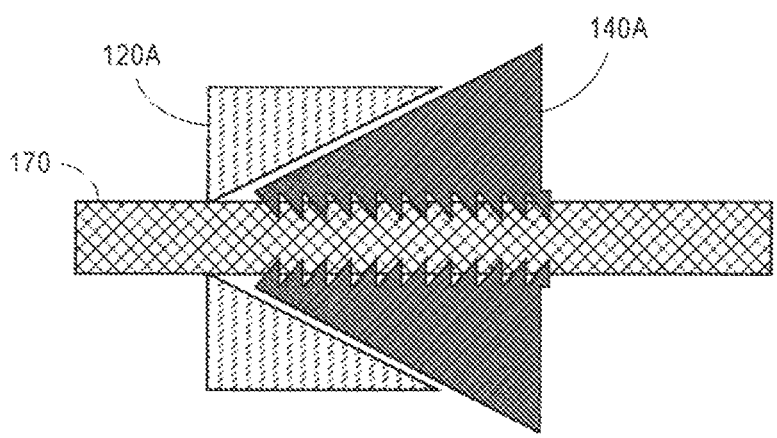
FIG. 6 illustrates a cross-sectional side view showing how the insert grips the line, according to an embodiment.

FIG. 6 illustrates a cross-sectional side view showing another embodiment the first insert 140A gripping the line 170. In this embodiment, the outer surface of the first insert 140A may be conical or frustoconical, and the inner surface of the first arm 120A of the tension-measurement device 100 may have a corresponding geometry. When the first portion of the line 171A is placed under tension 176, the first insert 140A may move (e.g., to the left, as shown in FIG. 6), causing the outer surface of the first insert 140A to slide along the inner surface of the first arm 120A. As a result, the first insert 140A may be compressed radially-inward simultaneously with its axial movement, thereby causing the first insert 140A to grip the line 170 tighter.

FIG. 7 illustrates a perspective view of another embodiment of the tension-measurement device 100 with the line 170 extending therethrough, and FIG. 8 illustrates a side, cross-sectional view of the of the tension-measurement device 100 without the line 170 extending therethrough, according to an embodiment. The tension-measurement device 100 in FIGS. 7 and 8 may be substantially the same shown in FIGS. 1-5, except a different first insert 740A and a different second insert 740B are shown. The second insert 740B is shown in more detail in FIGS. 9-12. The first insert 740A and second insert 740 may be substantially identical to one another.

FIG. 9 illustrates a perspective view of the second insert 740B in an open state, according to an embodiment. The second insert 740B may be configured to pivot into the open state to increase a width of the gap/channel 754 to allow the line 170 to be inserted into the bore 742B FIG. 10 illustrates a perspective view of the second insert 740B in the open state with the line 170 positioned therein, according to an embodiment.

FIG. 11 illustrates a perspective view of the second insert 740B in a closed state with the line 170 positioned therein, according to an embodiment. The second insert 740B may be configured to pivot into the closed state to reduce the width of the channel 754 to prevent the line 170 from being removed from the bore 742B. The second insert 740B may be secured in the closed state (e.g., with a fastener 748). The fastener 748 may be or include a screw, a bolt, a zip-tie, or the like. FIG. 12 illustrates a perspective view of the second insert 740B in the closed state with the line 170 positioned therein as the second insert 740B is being positioned within the second arm 120B, according to an embodiment. Thus, closing the second insert 740B and securing the second insert 740B in the closed state may pre-grip the line 170 before the second insert 740B and the line 170 are inserted into the second arm 120B.

Figure 13:
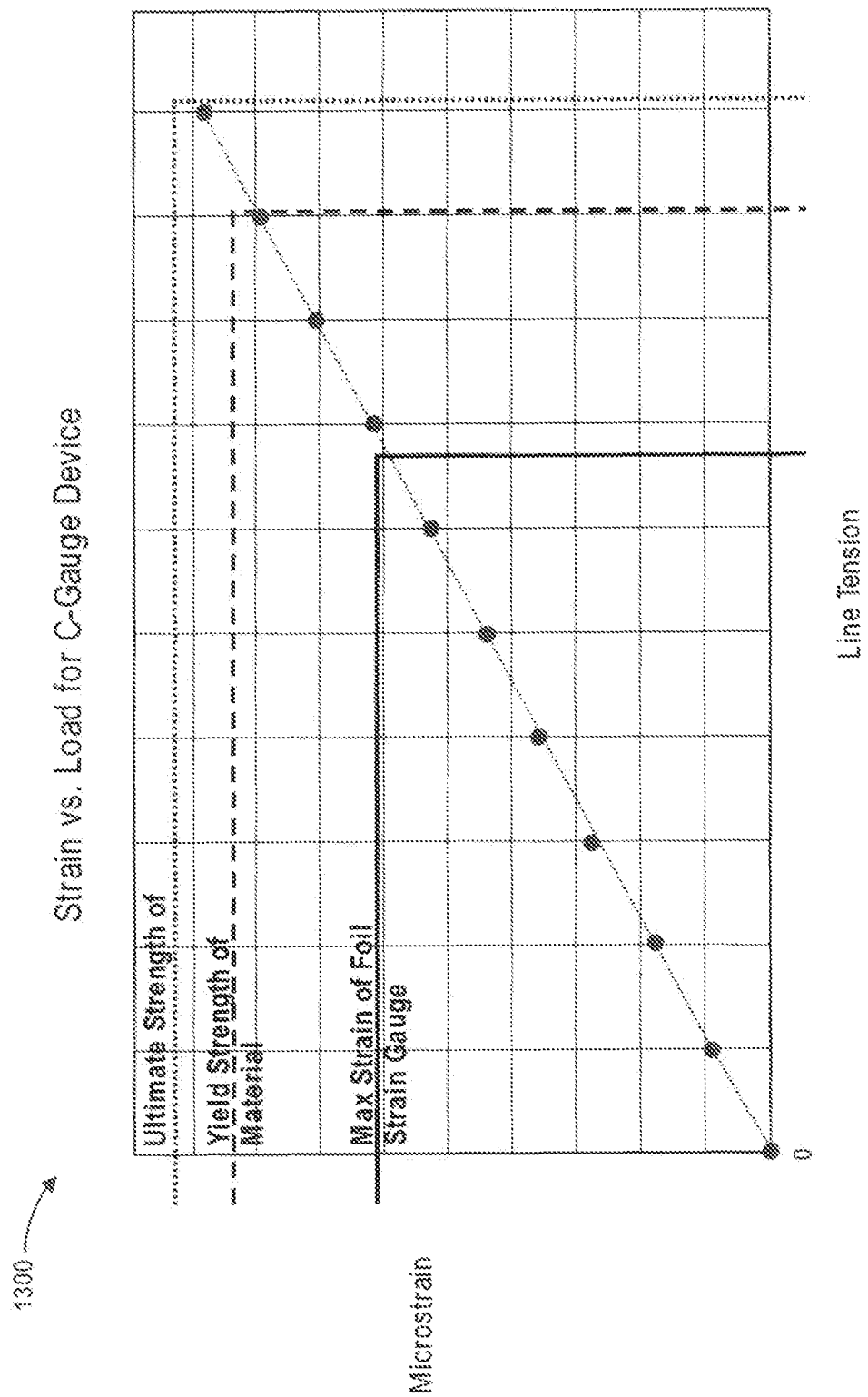
FIG. 13 illustrates a graph showing strain vs. load for the tension-measurement device, according to an embodiment.

FIG. 13 illustrates a graph 1300 showing strain vs. load for the tension-measurement device 100, according to an embodiment. The graph 1300 demonstrates the relationship between strain as measured by the first and second sensors 130A, 130B and the tension 176 in the line 170. Device design criteria are also shown in the graph 1300 including the material ultimate strength of the body 105, the material yield strength of the body 105, and the maximum strain of the first and second sensors 130A, 130B. The graph 1300 is imperially or otherwise derived and is used to determine the tension 176 of the line 170 from the strain measurement of the first and second sensors 130A, 130B.

Figure 14:
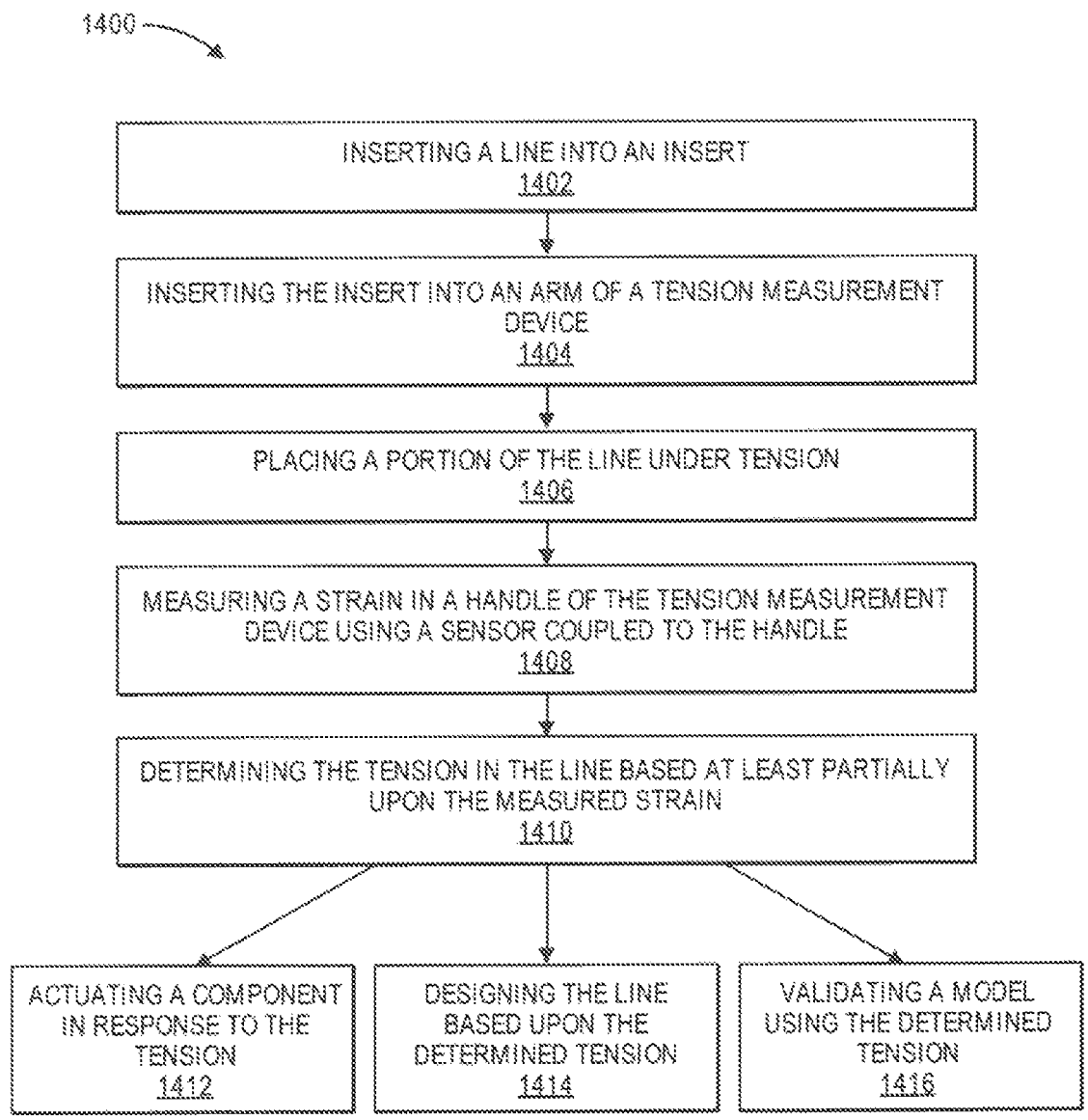
FIG. 14 illustrates a flowchart of a method for measuring the tension on the line using the tension-measurement device, according to an embodiment.

FIG. 14 illustrates a flowchart of a method 1400 for measuring the tension 176 in the (first portion 171A) of the line 170 using the tension-measurement device 100, according to an embodiment. The method 1400 may include inserting the line 170 into the first and second inserts 140A, 140B (or 740A, 740B), as at 1402. The line 170 may be inserted through the channels 154 (or 754) and into the first and second bores 142A, 142B (or 742A, 742B) in a first direction 172 (see FIGS. 3 and 7). In the embodiment of FIGS. 7-12, the first and second inserts 740A, 740B may be closed and then secured (e.g., with the fasteners 748).

The line 170 may be inserted such that second portion of the line 171B (between the first and second arms 120A, 120B is slack (i.e., not under tension) 178. The line 170 may only be in contact with the tension-measurement device 100 at only two separate locations and not three or more locations or points of contact.

The method 1400 may also include inserting the first and second inserts 140A, 140B (or 740A, 740B) into the first and second arms 120A, 120B of the tension-measurement device 100, as at 1404. The first and second inserts 140A, 140B (or 740A, 740B) may be inserted into the first and second arms 120A, 120B in opposing axial directions from one another. For example, the first and second inserts 140A, 140B (or 740A, 740B) may initially be positioned between the first and second arms 120A, 120B. The first insert 140A (or 740A) may then be moved in a second direction 174A into the first arm 120A, and the second insert 140B (of 740B) may be moved in an opposing third direction 174B into the second arm 120B (see FIGS. 3 and 7). The frustoconical shapes of the first and second inserts 140A, 140B (or 740A, 740B) may help to secure the first and second inserts 140A, 140B (or 740A, 740B) in place in the first and second arms 120A, 120B via a friction fit. In addition, the tension 176 on the line 170 may also exert a force on the first insert 140A (or 740A) in the second direction 174A, and on the second insert 140B (or 740B) in the third direction 174B to further help secure the first and second inserts 140A, 140B (or 740A, 740B) in place in the first and second arms 120A, 120B.

The method 1400 may also include placing a first portion of the line 171A under tension 176, as at 1406. The first portion of the line 171A may be outside (e.g., above and/or below) the first and second arms 120A, 120B. However, the first and second inserts 140A, 140B (or 740A, 740B) may grip the line 170 such that, even though the first portion of the line 171A is under tension 176, the second portion of the line 171B, between the first and second arms 120A, 120B, may remain slack 178. As described above, the tension in the first portion of the line 171A may cause the body 105 of the tension-measurement device 100 to bend, deflect, or otherwise deform, thereby generating strain 180 on the body 105. For example, the body 105 may act as a bending beam whereby the tension-measurement device 100 includes two (2) points of contact with the line 170 and does not include three (3) or more points of contact with the line 170. The bending of the body 105 may create a tension and compression strain and/or stress 180 in the top surface 112 and/or bottom surface 114 of the handle 110, respectively.

The method 1400 may also include measuring the strain and/or stress 180 on the body 105 using the first and second sensor(s) 130A, 130B, as at 140B. More particularly, the first sensor 130A may measure the tension strain and/or stress 180 on the top surfaces 112 of the handle 110, and the sensor 130B may measure the compression strain and/or stress 180 on the bottom surface 114 of the handle 110.

The method 1400 may also include determining the tension 176 on the line 170 based at least partially upon the measured strain and/or stress 180, as at 1410. More particularly, using the data shown in FIG. 13, the measured strain 180 may be correlated to the tension 176 in line 170.

The method 1400 may also include actuating a component in response to strain, stress, or tension, as at 1412. For example, the strain, stress, or tension may be transmitted in real-time, e.g., to flight software on a payload. In one example, this data may be used to make an informed decision regarding actuation of a component (e.g., a reefing line cutter) during flight operation, thus creating a smart parachute. In another example, this data may be used to monitor the health of a parachute and determine the best conditions for parachute deployment phases.

The method 1400 may also include gathering data to inform the design of the line 170 and its system (e.g., the selection of materials for parachute components), as at 1414. The method 1400 may also include utilizing measured data to validate computer, analytical, or other models (e.g., high fidelity computer models of textile and fluid dynamics), as at 1416.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A tension-measurement device configured to determine a tension in a line, comprising:
   a body comprising:
      a first portion;
      a second portion having a first inner surface wherein the second portion extends from the first portion of the body; and
      a third portion extending from the first portion of the body, wherein the line is configured to extend at least partially through the second and third portions of the body and physically contacts the second and third portions of the body representing a first and second point of contact, respectively;
   a first sensor coupled to the body and configured to measure a strain on the body when a first portion of the line is placed under tension; and
   an insert positioned at least partially within the second portion of the body, wherein the insert comprises:
      a substantially cylindrical portion having a second inner surface wherein the second inner surface defines a bore through which the line is configured to extend;
      a gripping structure on the second inner surface, wherein the gripping structure is comprised of teeth configured to grip the line;
      first and second arms that extend radially-outward from the substantially cylindrical portion, wherein the first and second arms define a channel through which the line is configured to pass before entering the bore; and
      a stopper that extends circumferentially from the first and second arms, and wherein the stopper is configured to contact the first inner surface to prevent further movement of the insert with respect to the second portion of the body,
   wherein the tension in the first portion of the line is configured to be determined based at least partially upon the strain,
   wherein the line physically contacts the tension-measurement device at only the first and second points of contact, and
   wherein the line does not contact the tension-measurement device at a third or more point of contact.

2. The tension-measurement device of claim 1, wherein the second and third portions of the body extend in a same direction from opposing ends of the first portion of the body, such that the body is substantially C-shaped.

3. The tension-measurement device of claim 1, wherein the second and third portions of the body are substantially perpendicular to the first portion of the body.

4. The tension-measurement device of claim 1, wherein the first sensor is coupled to the first portion of the body.

5. The tension-measurement device of claim 1, further comprising a second sensor coupled to the body and configured to measure the strain on the body when the first portion of the line is placed under tension, wherein the first and second sensors are coupled to opposing sides of the body.

6. The tension-measurement device of claim 5, wherein the first sensor is coupled to a first side of the first portion of the body that faces the line when the line is extending through the second and third portions of the body, and wherein the second sensor is coupled to a second side of the first portion of the body that faces away from the line when the line is extending through the second and third portions of the body.

7. The tension-measurement device of claim 1, wherein the first portion of the line is outside the second and third portions of the body, and wherein a second portion of the line, between the second and third portions of the body, is not under tension when the first sensor measures the strain.

8. A tension-measurement device configured to determine a tension in a line, comprising:
   a body comprising:
      a first portion;
      a second portion having a first inner surface wherein the second portion extends from the first portion of the body; and
      a third portion extending from the first portion of the body, wherein the second and third portions of the body extend in a same direction from opposing ends of the first portion of the body, such that the body is substantially C-shaped;
   an insert positioned at least partially within the second portion of the body, wherein the insert comprises:
      a substantially cylindrical portion having a second inner surface wherein the substantially cylindrical portion defines a bore through which the line is configured to extend;
      first and second arms that extend radially-outward from the substantially cylindrical portion, wherein the first and second arms define a channel through which the line is configured to pass before entering the bore;
      a stopper that extends circumferentially from the first and second arms, wherein the stopper is configured to contact the first inner surface to prevent further movement of the insert with respect to the second portion; and
      teeth on the second inner surface,
   wherein the teeth are configured to grip the line;
   a first sensor coupled to a first side of the first portion of the body that faces the line when the line is extending through the insert; and
   a second sensor coupled to a second, opposite side of the first portion of the body that faces away from the line when the line is extending through the insert, wherein the first and second sensors are configured to measure a strain on the body when a first portion of the line, outside the first and second portions of the body, is placed under tension, and when a second portion of the line, between the second and third portions of the body, is not under tension, and wherein the tension in the first portion of the line is configured to be determined based at least partially upon the strain.

9. The tension-measurement device of claim 8, wherein the first sensor is configured to measure a tension strain in the line, and wherein the second sensor is configured to measure a compression strain in the line.

* * * * *